Jan. 22, 1957   J. R. LOEFFLER   2,778,982
THYRATRON MOTOR CONTROL LIMIT CIRCUIT
Filed Sept. 28, 1955
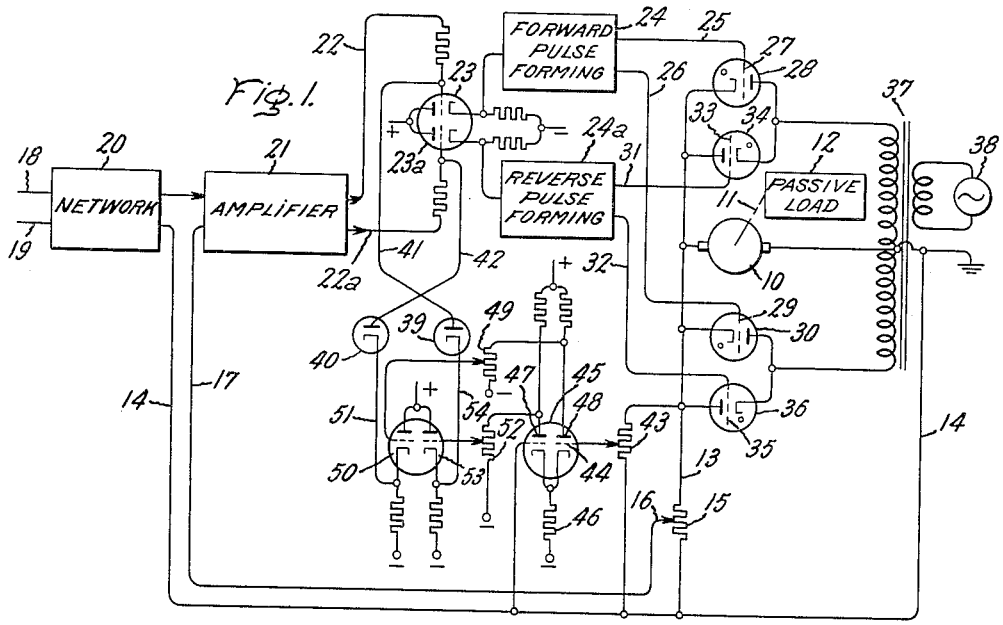
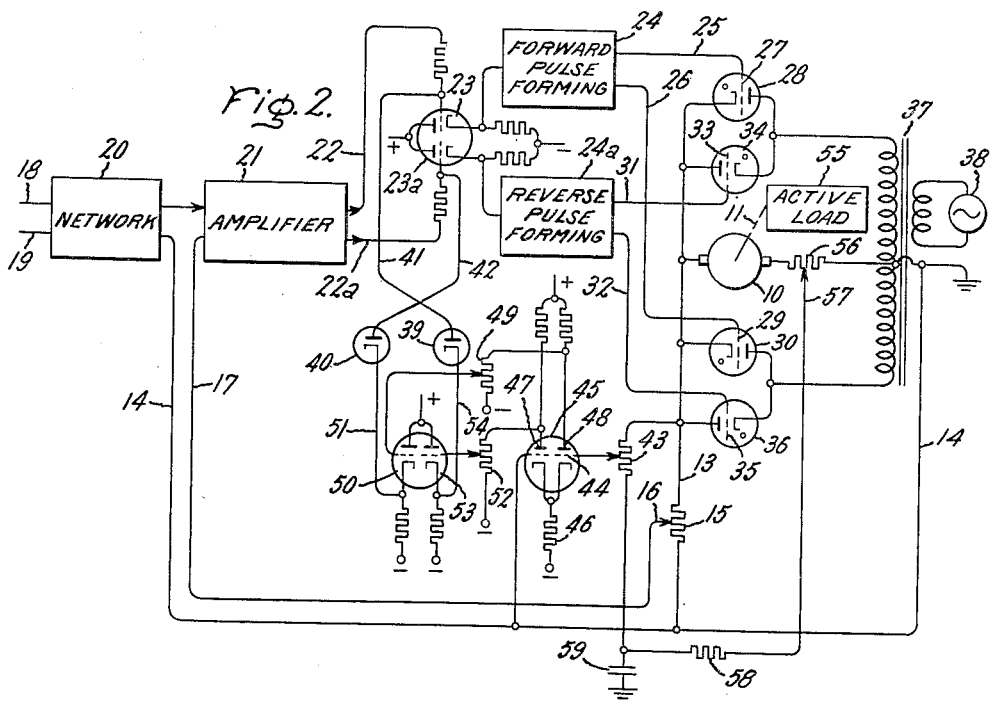
Inventor:
John R. Loeffler,
by Charles A. Mott
His Attorney.

United States Patent Office 2,778,982
Patented Jan. 22, 1957

2,778,982

THYRATRON MOTOR CONTROL LIMIT CIRCUIT

John R. Loeffler, Schenectady, N. Y., assignor to General Electric Company, a corporation of New York Application September 28, 1955, Serial No. 537,095

12 Claims. (Cl. 318—257)

This invention generally relates to automatic motor control systems for controlling the forward and reverse speeds and accelerations of a direct current electric motor, and more particularly to such systems enabling the motor to follow as rapidly as commutation allows signals demanding changes in speed and reversals in direction while eliminating excess energization of the motor and the resulting overheating, flash-over and commutator difficulties which normally result from excess energization.

In the operation of direct current motors, the current through the motor armature is proportional to the algebraic sum of the voltage applied to the motor and the countervoltage or back electromotive force generated by the motor armature as it revolves through the magnetic field generated by the field poles. Normally, if the applied voltage is driving the motor in a given direction, the countervoltage is opposed to the applied voltage and this resulting algebraic sum voltage directing current through the motor armature is within the design limits of the motor and maintains the motor operating at the desired speed. Similarly, if the applied voltage slowly increases or decreases, the motor accelerates to follow this increase or decrease; and this countervoltage, or counterelectromotive force, also increases or decreases, or reverses polarity until it has adjusted to the new conditions and substantially balances out the applied voltage. However, if the applied voltage should rapidly change in magnitude or reverse in polarity faster than the inertia of the running motor enables it to follow, the counterelectromotive force, being dependent upon the speed and direction of the motor, cannot change magnitude or reverse polarity at a fast enough rate to follow this rapid change in the applied voltage. Consequently, the resulting applied voltage appearing across the motor may become excessively large and exceed the design limits of the motor; in many instances being sufficiently large to cause overheating, and short circuiting or arcing at the commutator bars, commonly termed flash-over, and other commutator difficulties.

To correct for this condition, existing motor control systems employ a means for delaying the applied voltage and preventing this voltage from changing in polarity or magnitude more rapidly than the motor can absorb or commutate. However, such delaying means provide a fixed time delay for all applied signals without discriminating between those that are too large or occurring too rapidly and those that can be absorbed by the motor. Consequently, such fixed time lag means reduce the sensitivity and speed of response of the motor control system, making it sluggish and unresponsive to rapid changes in command and hence they do not utilize the optimum motor response. Furthermore, amplifying these delayed signals to compensate for this sluggish condition does not solve this problem, since overamplification results in instability.

In accordance with the present invention, a motor control system is provided incorporating a variable delay or discriminating means that withhold only command signals changing polarity or magnitude at rates faster than the motor can respond to, but do not affect those within the design limits of the motor, thereby providing a more effective and faster responding motor control system by more completely utilizing the capabilities of the motor. Since the ability of the motor to change speed and direction in response to changes in the command signal varies dependent upon the existing motor speed and direction as well as the rate of command signal change, the present invention measures the motor's existing capability to absorb changes in the command signal and rejects only those command signals that exceed these existing capabilities. Thus the present invention enables the motor to respond as rapidly as its characteristics allow to changes in the command signal while eliminating any excess energization that may cause overheating and commutator difficulties.

It is accordingly one object of the present invention to provide an improved system for more rapidly controlling a direct current motor in response to command signals.

A still further object of the present invention is to provide a direct motor control system for controlling the speed and direction of motors in response to command signals as rapidly as the capability of the motor will permit while eliminating motor commutator difficulties.

Other objects and many attendant advantages of this invention will be more readily comprehended to those skilled in the art upon a detailed consideration of the accompanying specification taken with the following drawings wherein:

Fig. 1 is an electrical schematic drawing illustrating one embodiment of the present invention, partially in block diagram form, and Fig. 2 is an electrical schematic drawing of a second embodiment of the present invention, partially in block diagram form.

Referring now to Fig. 1, there is shown schematically a direct current motor 10 connected by a suitable linkage 11 to drive a passive inertial load 12 which may, for example, be a movable surface of a navigable craft. Motor 10 may have a parallel shunt field winding (not shown) which is energized by a constant voltage source (not shown). Connected across the armature of motor 10 to measure the back or counterelectromotive force of this motor is placed a potentiometer 15 whose upper and lower fixed terminals are connected across the terminals of the motor 10 by lead 13 and ground lead 14. The movable slider of this potentiometer 15 thus provides a potential on line 17 to ground line 14 which is proportional to the back electromotive (E. M. F.) force of the motor and this potential is directed backwardly over line 17 and ground line 14 and algebraically combined with the applied input voltage or command signal received over lines 18 and 19 which are initially directed through an input network 20 into the motor control system. The algebraic sum of the applied voltage signals over lines 18 and 19 and the back E. M. F. over lines 17 and 14 is then entered into amplifier 21 for energizing the remainder of the motor control system for controlling the speed and direction of motor 10.

Thus it is observed that the resultant error signal entered into the motor control system to control the speed and direction of the motor 10 is the algebraic sum of the initial command signal prescribing the desired speed and direction of the motor and the signal representing the present speed and direction of the motor.

Amplifier 21 is preferably of the push-pull variety, the details of which are well known in the art, and provides two output signals in push-pull, one being more positive and the other being more negative; and the difference between these voltages being proportional to the input received by the amplifier. Referring to this drawing, one of these push-pull voltages is directed upwardly over line 22 and the second is directed over line 22a. Each of these push-pull error voltages is then conveyed to an isolating circuit, preferably a cathode follower circuit 23 and 23a, respectively, and thence each signal is directed to a pulse forming network 24 and 24a, respectively.

Pulse forming networks 24 and 24a are essentially phase shifting devices, preferably of the type disclosed by my copending application Ser. No. 536,344, filed Sept. 26, 1955, and assigned to the assignee of the present invention, generating variable time phase impulses which are directed to the control grids of gas filled electron tube rectifiers to control the time during each half cycle of an alternating current voltage source that these gas filled tubes conduct current to the motor 10. More specifically, pulse forming network 24, labeled "forward pulse forming" has two output lines 25 and 26; line 25 being directed to the control grid 27 of gas tube 28, and line 26 being directed to the control grid 29 of gas tube 30. Similarly, pulse forming network 24a, labeled "reverse pulse forming" has two output lines 31 and 32; line 31 being directed to control grid 33 of gas tube 34, and line 32 being directed to the control grid 35 of gas tube 36.

Gas tubes 28 and 30 are poled in the same direction and are each directed across opposite ends of the secondary winding of a center tapped power transformer 37 whose primary winding is energized by alternating current power source 38. As each of these tubes conduct, current flows from the plate element to the cathode element and thence passes into the left hand side of the motor armature 10 and through this armature to the center tap of the transformer 37. Thus it is observed that as tubes 28 and 30 conduct current, motor 10 is energized by a full wave rectified direct current in a direction to cause the rotation of this motor in a given direction. The length of time that each of these gas tubes conducts determines the amount of power being directed to energize this motor. Similarly, gas filled tubes 34 and 36 are both poled in the same direction and are connected across opposite ends of the transformer secondary winding 37. However, these tubes are poled in an opposite direction from the forward gas tubes 28 and 30 and cause current flow from right to left through the motor armature 10, causing the rotation of the motor in the opposite direction.

Pulse forming networks 24 and 24a thus respond to the magnitude of the error voltages being directed to their inputs to generate time phase shiftable impulses that control the conduction time of the gas filled tubes and accordingly control the power energizing the motor and the resulting speed of this motor. Such time phase shifting pulse networks responding to the magnitude of an input signal to generate time phase shiftable impulses over a range of zero to 180° are well known in the art and the details of these particular circuits are not considered part of the present invention, since any number of such circuits as known in the art can be employed herein.

The circuit thus far described may be considered typical of a speed control known in the art, and for the purpose of describing one preferred embodiment of the present invention, the operation of this circuitry will be summarized together with the changes innovated by the present invention. Initially, the applied voltage or command signal is algebraically combined with a signal related to the speed of the motor (counter or back electromotive force) to derive an error signal that is then converted into push-pull error signals. Each of these push-pull error signals controls the conduction time of a different pair of gas tube rectifiers. One pair of these gas tube rectifiers controls the flow of power to the motor in one direction, and the second pair of gas tube rectifiers controls the flow of power in the opposite direction. In responding to this power the speed of the motor adjusts itself until its back or counter E. M. F. is substantially equal and opposite to the command signal voltage at which time the relationship of the push-pull error voltages is such as to cause conduction through the gas tubes as necessary to maintain the motor running at that speed. As one of these push-pull error voltages increases in the positive direction, it causes the forward acting gas tubes to conduct for a longer period of time and supply more power of that polarity to the motor, resulting in the motor increasing its speed. Conversely, when the second of the push-pull voltages becomes more positive and the first less positive, the opposite acting pair of gas tubes conduct, directing power in the opposite direction to the motor and tending to slow down and reverse the direction of the motor travel as called for by the opposite polarity voltage across the motor. However, because of the inertia of the rotating motor armature, a finite period of time is required to slow down the motor to a halt and drive its armature in the opposite direction; and during this finite time interval the armature generated voltage remains at the same polarity, but the power applied to the motor as commanded by the error signals has reversed its preceding direction. As a result, the counterelectromotive force no longer opposes the power being applied to drive the motor but aids it, with the result of attempting to force a greater current through the armature than the motor may be able to tolerate. This excessive energization may result in overheating, arcing or flashover and other motor commutator difficulties. Similarly, if the motor is traveling in a given direction and an error signal of very large amplitude is transiently entered commanding the motor to rapidly speed up in this direction at a greater rate than the motor inertia allows, a finite time is also required before the motor can reach this new rate of speed called for by the command signal. During this time, also, large excess power may be applied to the armature, again possibly causing overheating and commutator difficulties.

In accordance with the present invention, means are provided to slow down the response of the system to such undesirably large changes in the command signal or to undesirably rapid demands calling for reversal of the motor direction, while at the same time allowing smaller command signals or less rapid commands for reversing the motor direction to be passed through the system unaltered. By discriminating and restraining only the undesirably large changes of magnitude or reversals in polarity from controlling power to the motor, the system obtains the greatest sensitivity and speed of motor response to commands that can be tolerated and absorbed by the motor itself.

More specifically, in accordance with one preferred embodiment of the invention, a continuously acting regulating means is provided to prevent the push-pull error signals over lines 22 and 22a from changing magnitude or reversing polarity more rapidly than the motor can absorb. As shown, this variable regulator preferably takes the form of a pair of diodes or rectifiers 39 and 40, each having a plate element connected to a different one of the control grids of isolating tubes 23 and 23a. Rectifier 39 has its plate element connected over line 41 with the control grid of tube 23, and is effectively in shunt with one of the push-pull error voltages over line 22; and rectifier 40 has its plate element connected over line 42 to the control grid of isolator tube 23a and, therefore, is effectively in shunt with the second push-pull error voltage over line 22a. The cathode elements of these rectifier tubes are energized with variable voltages in push-pull arrangement whose relative difference in magnitude is proportional to the existing speed of the motor, and its relative polarity is proportional to the direction of rotation of the motor. For example, assuming the motor is moving in a forward direction, the potential on the cathode element of rectifier 39 is more positive than the potential on the cathode element of rectifier 40, and the difference between these two voltages is proportional to the speed of motor rotation. Further, assuming in this example that the command signal entering input lines 18 and 19 calls for a greatly increased speed of the motor 10, this command signal is transmitted through the network 20 and push-pull amplifier 21, resulting in line 22 attempting to go much more positively, and line 23 attempting to go much more negatively. Although the error voltage on line 22 rapidly attempts to increase, the potential on the cathode element of rectifier 39 remains substantially constant since the motor cannot change speed at this rapid a rate. As a result, the plate element of rectifier 39 is made slightly more positive than the cathode element, and current is shunted through the rectifier 39 preventing the voltage on line 22 from rapidly increasing in value and enabling this increase to take place only as rapidly as the cathode element of rectifier 39 positively increases as the motor accelerates and increases in speed. As the speed of the motor is progressively increased, the potential on the cathode of rectifier 39 also progressively increases in the same direction and less and less of the current from line 22 is shunted through the rectifier 39. As this occurs, line 22 becomes more and more positive as its limit moves to a condition corresponding to the higher speed of the motor and the error voltage being generated over line 22 is also allowed to increase and continue to supply more power to the motor. Thus, by means of this variable limiting of the error push-pull voltages of the motor excessive power is prevented from being applied to the motor armature and overheating of the motor windings and commutator difficulties are eliminated. On the other hand, if these demands in change of speed do not occur at too rapid a rate so that the motor can follow these changes, the push-pull limiting voltages applied to the cathodes of the rectifier tubes 39 and 40 also change by increasing and decreasing at the same rate as the commanding push-pull error signals over lines 22 and 22a. Consequently, no current is shunted through the limiting rectifier tubes and the full push-pull error voltages on lines 22 and 22a are directed to the pulse forming networks 24 and 24a to change the conducting time of the gas filled electron tube rectifiers and thereby variably control the speed of the motor as commanded by the push-pull error signals over lines 22 and 22a.

Considering one example of this operation in greater detail and assuming the motor armature is being driven in a forwardly acting direction and its left hand terminal is at a more positive potential than its right hand terminal, an increased error signal entering lines 18 and 19 and passing through the network 20 is compared with the back or counterelectromotive force appearing across lines 17 and 14, and the resulting difference or error signal is amplified by push-pull amplifier 21 making line 22 more positive and line 22a less positive. The increased potential on line 22 is then passed through the isolating circuit 23 to the forward pulse forming network 24 and impulses being generated over lines 25 and 26 are advanced in phase. These advanced impulses cause forward gas tubes 28 and 30 to conduct earlier in each half of the alternating cycle, thereby directing a greater amount of current flow through the armature of motor 10 and increasing its speed. As the motor's speed increases, the back E. M. F. across motor armature 10 increases and this increase appears across potential divider 43 and thence passes from its movable slider to the control grid 44 of the pair of electron tubes, generally designated 45, that are differentially connected. As the control grids of the right hand side of these differentially connected tubes become more positive, a greater current flows through this tube, tending to increase the potential across a resistor 46 commonly connected to the cathodes of both differentially connected tubes. This lessens the conduction through the left hand tube, raising the potential on the plate element 47 of the left hand tube. Meanwhile, the increased conduction through the right hand tube 45 lowers the potential on the plate element of this right hand section. Thus, these differentially connected tubes 45 operate as a push-pull signal generator in response to the input signal appearing on the right hand control grid and the difference in magnitude of these push-pull signals is proportional to the back electromotive force generated by the motor, and the relative polarity of these push-pull signals is proportional to the direction of rotation of this motor.

The decreased potential on the right hand plate element 48 is then directed to a variable potential divider circuit generally designated 49, and to an isolating circuit, preferably comprising a cathode follower 50 as shown, and thence upwardly over line 51 to energize the cathode limit rectifier 40. The more positive potential on the plate element 47 of the left hand tube is directed through a similar potential dividing circuit 52 and an isolating circuit 53, preferably of the cathode follower variety, as shown, and thence upwardly over line 54 to energize the cathode of limit rectifier 39. Thus the cathode elements of the limiting rectifiers 39 and 40 are energized by push-pull voltages proportional to the back E. M. F. generated by motor 10, and these rectifiers operate to limit the maximum amplitude of the push-pull error voltage signals over lines 22 and 22a in such a manner as to prevent these voltages from changing at a rate more rapidly than the motor can follow.

Thus, in effect, a continuously variable limiting is provided to prevent excess energization of the motor armature 10, enabling this motor to change speed or direction in response to commands only as rapidly as the motor can absorb. This invention then, is to be contrasted with prior systems providing an artificial constant delay or constant limiting of the error signals; since the speed of the motor itself in the present invention determines when limiting is necessary and to what extent limiting is necessary, rather than an artificial reference or standard that provides a fixed delay or limiting as in prior systems.

Tracing through the operation of this circuitry again to illustrate the control exerted upon a rapid reversal of the command signal; as the push-pull error command signals rapidly reverse polarity, calling for a slowing down of the motor and a reversal in the direction of motor rotation, line 22 becomes more negative and line 22a more positive. Since the motor is rotating at that instant in a forward direction, the limiting voltage on the cathode of rectifier 39 is more positive and the limiting voltage on the cathode of rectifier 40 is more negative. Therefore, the increased positive potential on line 22a tends to be much greater than the negative bias on the cathode of limiting rectifier 40 and current is shunted from line 22a through rectifier 40, thereby preventing line 22a from increasing potential and causing a too rapid reversal of the voltage to motor 10. On the other hand, as the signal on line 22 is made less positive, this decreased potential operates on the forward pulse forming network 24 to retard the impulses being directed to the control grids 27 and 29 of gas tubes 28 and 30 and thereby decreasing the positive acting power energizing the motor 10. Thus the motor 10 slows down and the counterelectromotive force is decreased, lowering the potential energizing the cathode of limiting rectifier 39 and raising the potential energizing the cathode of limiting rectifier 40. If changes in command signal requiring reversal of motor direction occur rapidly, the impulses from the forward pulse forming network are sufficiently retarded to cut off conduction of the gas tubes 28 and 30 completely.

As the motor slows down, the signal applied to the cathode of limiting rectifier 40 becomes more and more positive and a greater and greater positive error voltage being generated over line 22a is allowed to pass through isolating tube 23a to the reverse pulse forming network 24a. Impulses generated by pulse forming network 24a are thus advanced in phase and gradually increase the conducting time of reverse gas filled tubes 34 and 36, thereby energizing motor 10 in the reverse direction. During this reversal of motor direction braking of the motor occurs, as known to those skilled in the art, due to the motor operating as a generator and forcing additional current through its armature and through rectifiers 34 and 36. Following this step-by-step procedure, it is observed that the motor 10 slows down in the forward direction as rapidly as its own inertia and the regenerative braking action allow, until it ultimately comes to a stop and is driven in the opposite direction by the power being directed through reverse gas tubes 34 and 36. As these changes take place, the push-pull voltages appearing on the cathodes of limiting diodes 39 and 40 reflect these changes, and progressively decrease the amount of limiting being imposed upon the rapidly reversed error signals being directed over lines 22 and 22a. Consequently, as fast as motor 10 can absorb this increased power in a reversed direction, the conducting time of reverse gas tubes 34 and 36 is increased and the motor is accelerated in a reverse direction until reaching the commanded speed.

*Second embodiment of the present invention*

In the embodiment above described, the load was presumed to be a passive load; that is, one exerting only an inertial force on the motor armature. However, if the load on the motor is not a passive or purely inertial load, but is one that may exert a positive torque against the motor itself, for example, if the motor is driving a pump that is working against a pressure head, the load may exert a torque on the motor itself which may tend to accelerate the motor in a reverse direction from that in which it is being driven. When it is desired to reverse the direction of such an active load, a condition may exist where the load continues to drive the motor in the same direction and the variable limiting circuit of the present invention prevents a sufficiently large error signal from passing through this system to overcome this torque of this load. In other words, a condition may exist where the back E. M. F. of the motor is negative at the same time that a positive current is flowing through the motor.

To overcome this effect, it is preferred to artificially raise the limiting potential being transmitted backwardly to the variable limiting rectifiers beyond that of the potential being generated by the counter electromotive force of the motor. For example, if the motor is drawing a positive current to compel forward rotation of the motor and this positive current is not sufficient to operate the motor in the positive direction against the torque being exerted by the load, it is desired to increase the limiting potential so that artificially increased error voltages can direct the gas tubes to fire for longer periods of time and pass more positive power through the motor armature and thereby overcome this additional effect of the active load.

To raise these limiting voltages being directed backwardly to the cathodes of limiting rectifiers 39 and 40 and thereby enable greater error voltages over lines 22 and 22a to increase the power being directed to the motor 10, the signal being fed back to the limiting rectifiers is preferably increased to include a signal proportional to the existing current flowing through the motor 10. By this increase, the push-pull error signal being derived from the command signal can build up more rapidly in the reverse direction before any limiting takes place and thereby pass a greater amount of positive current through the motor to overcome the effect of the active load.

Referring to Fig. 2, showing one preferred modification incorporating this additional compensation for an active load, a potentiometer 56 is placed in series with the motor armature and receives current which passes through the motor armature. A movable wiper 57 connected across this potentiometer provides a voltage proportional to the current passing through this resistor and this voltage is directed downwardly through a second resistor 58 to one terminal of a capacitor 59 whose opposite terminal is connected to ground. Capacitor 59 is therefore charged with a potential proportional to the flow of current through the motor. This potential is then added in series with the potential reflecting the back electromotive force of the motor and being generated across potentiometer 43, and the movable wiper of potentiometer 43 thus generates a combined signal proportional to the sum of the back electromotive force of the motor together with the added potential proportional to current flow through the motor. Assuming it is desired to reverse the direction of motor 10, therefore, as the motor slows down it may reach a point where further slowing down is prevented by the torque by the active load. The motor is thus being driven by the load even though the current to the motor is in the proper direction to turn the motor in the opposite direction. However, the potential across potentiometer 43 is now the combination of the back E. M. F. of the motor, indicating one direction of rotation combined with the current being passed through the motor which reflects a different direction of rotation of the motor, and these two signals oppose one another with the result that the push-pull limiting signals to the cathodes of rectifiers 39 and 40 appear as if the motor has either slowed down to a stop or is operating in the opposite direction. As this occurs, a greater portion of the push-pull error signals being directed over lines 22 and 22a are not limited by the limiting rectifiers 39 and 40, and these signals are directed to the pulse forming networks 24 and 24a, tending to force more current through the motor in a direction to overcome the load and gradually reverse the motor against the torque exerted by the motor until the motor is operating as desired.

Although this invention has been illustrated and described in connection with particular circuitry for controlling the energization of a direct current motor by an applied command signal, and for variably limiting the degree of energization of said motor in accordance with the existing speed and motor current to prevent excess power from causing overheating and commutation difficulties, it is believed obvious to those skilled in the art that this invention is not limited to any such particular circuitry, and many means other than those described can be used in accordance with these teachings. Therefore, this invention is to be considered as limited only in accordance with the claims appended hereto.

What I claim as new and desire to secure by Letters Patent in the United States is:

1. In a system for controlling the speed of a direct current motor in response to a signal proportional to the difference between the existing speed of the motor and the desired speed of the motor, means for preventing the application of undesirably large amounts of excess power from energizing the motor as a result of rapid changes in the desired speed, said means including a means for generating a reversible signal proportional to existing motor speed, and a means continuously responsive to said difference signal and said reversible signal for limiting the maximum amplitude of said difference signal to a value slightly greater than said reversible signal.

2. In a system for controlling the speed of a direct current motor in response to a signal proportional to the difference between the speed of the motor and the desired speed of the motor, means for preventing the application of undesirably large amounts of excess power from energizing the motor as a result of rapid changes in the desired speed, said means including means for generating a signal proportional to the existing motor speed, means for generating a signal proportional to the current flowing through said motor, means for algebraically adding said speed signal and current signal, and means continuously responsive to said algebraically added signals and said difference signal for continuously limiting the maximum amplitude of said difference signal to a value slightly greater than said algebraically added signal.

3. In a system for controlling the speed of a motor, means responsive to the polarity and amplitude of an input signal for reversibly and variably applying power to drive said motor, and means responsive to the speed of said motor for preventing excess power from energizing said motor in response to rapid changes in said input signal, said preventing means including a means for generating a signal proportional to existing motor speed and a means for comparing this speed voltage with said input voltage and limiting the maximum value of said input voltage to a value slightly greater than said speed voltage.

4. In a system for controlling the speed of a motor, means responsive to the polarity and amplitude of an input signal for reversibly and variably applying power to drive said motor and means responsive to the speed and torque of said motor for preventing excess energization of said motor in response to rapid changes in said input signal, said preventing means including a means for generating a signal proportional to existing motor speed, means for generating a signal proportional to the current flowing through said motor, means for algebraically combining said second signal and motor current signal, and means continuously responsive to said combined signal and input signal for continuously limiting the maximum amplitude of said input signal to a value slightly greater than said algebraically added signal.

5. In a system for reversibly controlling the speed of a direct current motor in response to an input signal, a first power supplying means for variably energizing said motor in one direction, a second power supplying means for variably energizing said motor in an opposite direction, means responsive to the polarity of said input control signal for selectively operating said first or second power means and responsive to the amplitude of said input signal for regulating the power generated by said selected power means, and means for variably limiting the maximum amplitude of said input signal as a function of the speed of said motor.

6. In a system for controlling the speed of a motor, means responsive to the polarity and amplitude of an input signal for reversibly and variably applying power to drive said motor and means responsive to the speed and torque of said motor for preventing excess energization of said motor in response to rapid changes in said input signal, said preventing means including a means for generating a signal proportional to existing motor speed, means for generating a signal proportional to the current flowing through said motor, means for algebraically adding said second signal and motor current signal, and means for variably limiting the maximum amplitude of said input signal as a function of the speed and torque of said motor.

7. In a system for reversibly controlling the speed of a direct current motor, a first power supplying means for variably energizing said motor in one direction, a second power supplying means for variably energizing said motor in the opposite direction, means responsive to the polarity of an input control signal for selectively operating said first or second power means and responsive to the amplitude of said input signal for regulating the power generated by said selected power means, and means for variably limiting the maximum amplitude of said input signal as a function of the speed of said motor, said means including a means for generating a signal proportional to the existing motor speed, and means continuously responsive to said input signal and said speed signal for limiting the maximum amplitude of said input signal to a value slightly greater than said speed signal.

8. In a system for reversibly controlling the speed of a direct current motor, a first power supplying means for variably energizing said motor in one direction, a second power supplying means for variably energizing said motor in the opposite direction, means responsive to the polarity of input control signal for selectively operating said first or second power means and responsive to the amplitude of said input signal for regulating the power generated by said selective power means, and means for variably limiting the maximum amplitude of said input signal as a function of the speed and torque of said motor, said variable limiting means including a means for generating a signal proportional to the existing speed of the motor, means for generating a signal proportional to the current flowing through said motor, means for algebraically adding said speed signal and motor current signal, and means continuously responsive to said algebraically added signal and said input signal for continuously limiting the maximum value of said input signal to a value slightly greater than said algebraically added signal.

9. In a system for controlling the speed of a direct current motor, a first power supplying means for variably energizing the motor in a forward direction, a second power supplying means for variably energizing said motor in a reverse direction, means responsive to the motor speed for generating two push-pull signals whose relative amplitude is proportional to the existing motor speed and whose relative polarity is proportional to the direction of motor rotation, means responsive to an input commanding signal for generating two push-pull signals whose relative amplitude is proportional to the amplitude of said command signal and whose relative polarity is proportional to the polarity of said command signal, a pair of limiting circuits, each said limiting circuit being energized by a different one of said push-pull input signals and a different one of said motor speed signals and each having an output for variably controlling the power generated by a different one of said power supplying means, and each said limiting means limiting the maximum value of its energizing push-pull command signal that occurs in a direction to cause increased power flow to the motor to a value slightly greater than the energizing push-pull speed signal.

10. In a system for controlling the speed of a direct current motor, a first power supplying means for energizing said motor in a forward direction, a second power supplying means for energizing said motor in a reverse direction, means responsive to the speed and direction of motor rotation for generating a signal of variable amplitude proportional to motor speed and of reversible polarity proportional to the direction of motor rotation, means responsive to the current passing through the motor for generating a signal of variable amplitude proportional to the motor torque and variable polarity proportional to the direction of torque, summing means responsive to said speed and torque signals for algebraically adding said signals and generating two push-pull signals whose relative amplitude is proportional to said algebraic sum and whose relative polarity is proportional to the polarity of said algebraic sum, means responsive to an input signal for generating two push-pull error signals whose relative amplitude is proportional to the amplitude of said input signal and whose relative polarity is proportional to the polarity of said input signal, a pair of limiting circuits, each said limiting circuit being energized by a different one of said push-pull input signals and a different one of said push-pull algebraic sum signals, and each said limit circuits having an output for variably controlling the power generated by a different one of said power supplying means, and each said limiting means regulating the maximum value of its energizing push-pull error signal that occurs in a direction to cause increased power flow to the motor to a value slightly greater than its energizing push-pull algebraic sum signal.

11. In a system for controlling the speed and direction of rotation of a direct current motor in response to the relative amplitudes and polarities of a pair of push-pull error signals, two pairs of rectifying means energizable by an alternating current source, each pair responsive to a different one of said two push-pull error signals for variably energizing said motor with an opposite polarity of D.-C. rectified potential, means for variably limiting undesirably rapid changes in the relative amplitude and polarity of said push-pull error signals from effecting corresponding undesirable rapid variations in said D.-C. rectified potentials that compel a change in motor speed or direction greater than the motor can tolerate, such variable limiting means including a means responsive to existing motor speed for generating a first feed-back voltage, a push-pull signal transmitter energized by said first feed-back voltage for generating a pair of push-pull feedback signals proportional thereto, a pair of limiting devices, each limiting device in a shunting circuit with a different one of said error signals to limit the maximum amplitude of said push-pull error signals, and means for energizing each of said limiting devices by a different one of said push-pull feedback voltages to vary the maximum amplitude of said error signals as a function of existing motor speed.

12. In the system of claim 11, means responsive to the amplitude and polarity of current flowing through the motor for generating a second feedback voltage, and means for additionally energizing said push-pull generator by said second feedback voltage for generating said pair of push-pull feedback signals that are proportional to the algebraic sum of said first and second feedback voltages.

No references cited.